June 12, 1962 W. T. RENTSCHLER 3,038,398
PHOTOGRAPHIC CAMERA WITH AUTOMATIC EXPOSURE SETTING
Filed April 13, 1960
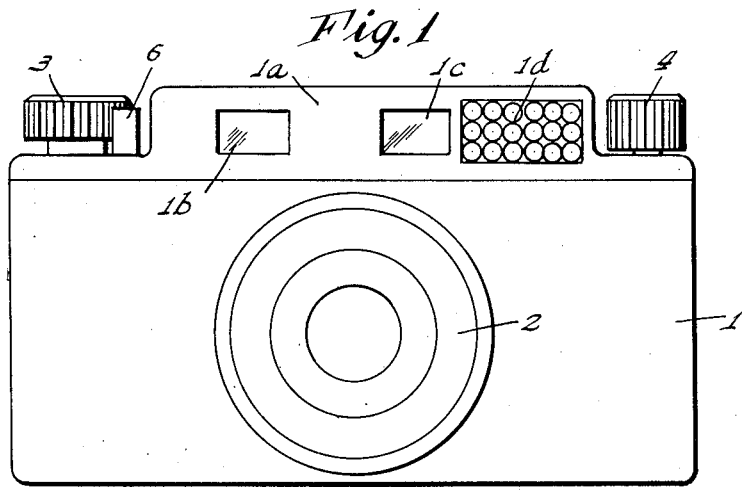
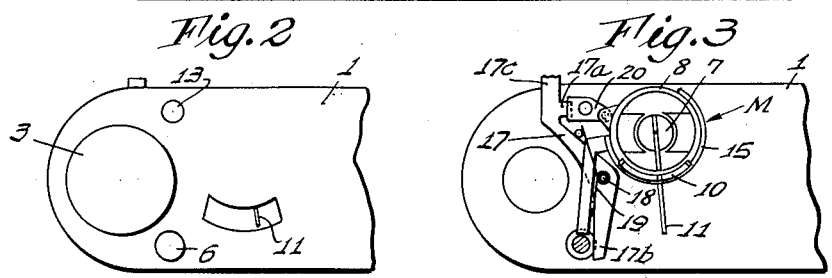
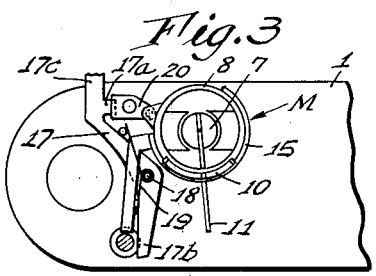
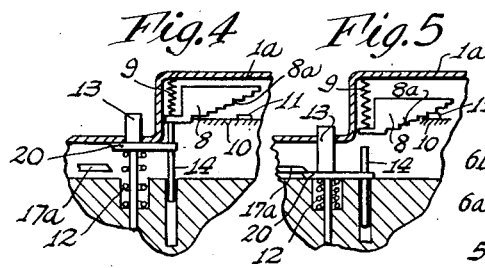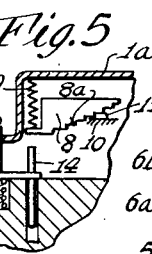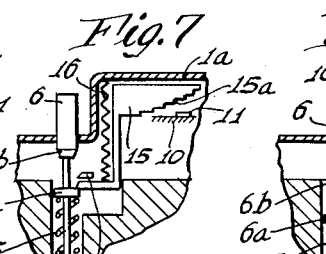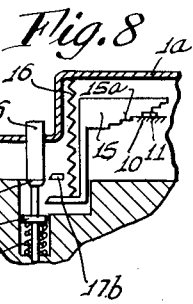
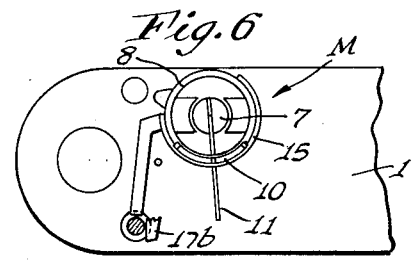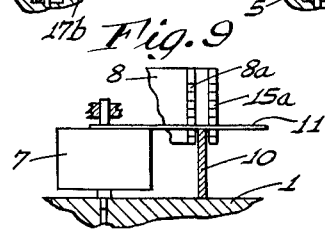
INVENTOR.
Waldemar T. Rentschler
BY
March, Gillette, Virgil & Eslinger
ATTORNEYS

United States Patent Office 3,038,398
Patented June 12, 1962

3,038,398
PHOTOGRAPHIC CAMERA WITH AUTOMATIC EXPOSURE SETTING
Waldemar T. Rentschler, Calmbach (Enz), Germany, assignor to Alfred Gauthier G.m.b.H., Calmbach (Enz), Germany, a corporation of Germany
Filed Apr. 13, 1960, Ser. No. 22,000
Claims priority, application Germany Apr. 14, 1959
5 Claims. (Cl. 95—10)

This invention relates to photographic cameras of the type providing automatic exposure settings, wherein an exposure meter having a movable measuring member cooperates with a sensing member, the latter sensing the position of the measuring member in response to operation of the camera or shutter release. In such cameras the sensing member is connected to an exposure setting member such as the diaphragm or speed setting member, thereby to effect an automatic adjustment of the same.

In situations involving photography, where the subject which is to be photographed has areas of marked contrast, as for example where an important portion of the subject exhibits appreciable differences of brightness with respect to the surroundings or remainder of the subject, it is desirable in order to avoid faulty exposures to obtain a close measurement of the light directly from the said important portions by means of a so-called "object measuring" procedure. Such "object measuring" procedure cannot, however, be carried out in cameras of the general above-described automatic setting type, since in such cameras the sensing of the position of the measuring member of the exposure meter occurs only when the camera release is actuated. This type of operation therefore requires that the measuring of the photographic light values be effected only from the point at which the photograph is to be taken, that is, the ultimate location of the camera where the exposure is to be made.

It is the technical object of the invention to provide a novel, automatic-setting type camera of the above-described kind, which is simple and uncomplicated in its construction and also simple to operate and understand, but wherein the said "object-measuring" procedure by which there are determined the proper exposure values, may be the same as with cameras which do not have the automatic exposure setting system and limitations thereof which require that the functioning of the exposure meter follows actuation of the camera release.

The invention attains the above object by the provision of a special or separate, manually operable position-fixing device which enables the user to fix or hold in different adjusted positions the movable measuring mechanism at a time prior to actuation of the camera or shutter release. Thus, the arrangement for setting the camera is much more flexible than in ordinary "automatic setting" cameras, and permits the above-mentioned "object measuring" procedure to be employed with subjects wherein there is appreciable contrast, with marked differences in the brightness of the light at different areas of the subject.

In order to make sure that the movable measuring member of the exposure meter is reliably detained in its various adjusted positions for any desired length of time without requiring a positive act (such as a holding pressure or the like) on the part of the operator, the invention further provides a novel locking device by means of which the position-fixing device may be retained in its operative position until such time as it is desired or required that the position be discontinued. The novel locking device is arranged to be selectively either released automatically in response to operation of the camera or shutter release, or else released manually.

An especially economical construction of the present organization is obtained by constituting the locking device as a pivotal lever, which, under the action of a suitable spring, engages a member or part of the position-fixing device when the latter is in its operating condition, said lever being pivotally movable against the action of its spring either manually by means of an actuating fingerpiece provided on the lever or else by means of a cam provided on the camera or shutter release and arranged to be shifted when said release is operated.

The invention is explained in detail in the accompanying drawings, which illustrate one embodiment. In the drawings:

FIG. 1 is a front elevational view of a photographic camera embodying the invention.

FIG. 2 is a fragmentary top plan view of a portion of the camera shown in FIG. 1.

FIG. 3 is a top plan view of portions of the automatic setting mechanism and light measuring system as provided by the invention, this view being taken from the top of the camera and being similar to that of FIG. 2 except that the covering plate of the camera is removed to reveal the interior structures. The sensing and position-fixing devices are illustrated, and the cooperation of these with the movable measuring member of an exposure meter which is built into the camera.

FIG. 4 is a fragmentary vertical sectional view, diagrammatic in nature, taken through the structure illustrated in FIG. 3 and showing in its inoperative position the position-fixing device which is engageable with the movable measuring member.

FIG. 5 is a view like FIG. 4 but showing the position-fixing device in its operative position.

FIG. 6 is a view like that of FIG. 3 but showing the control and operating members for the position-fixing device as having been omitted.

FIG. 7 is a vertical sectional view somewhat along the lines of that of FIG. 4, but showing in its inoperative position the sensing device which cooperates with the movable measuring member of the exposure meter.

FIG. 8 is a view like that of FIG. 7, but showing the sensing device in its operative position.

FIG. 9 is a diagrammatic view partly in side elevation and partly in vertical section, showing the movable measuring member of the exposure meter, together with the sensing and position-fixing devices which are cooperable with said member.

Referring now particularly to the figures, the housing or case of the photographic camera is indicated by the numeral 1. Affixed to the front of the housing 1 in a well-known manner per se is a photographic intra-lens shutter assemblage 2. Operating knobs 3 and 4 for the film transport and film rewinding devices are shown as mounted on the top of the case 1. Adjacent the operating knob 3 at the top of the camera case is a shutter release plunger 6 which is movable in a direction perpendicular to the axis of the camera, against the action of a return spring 5, all in the usual manner. In addition to the foregoing, the automatic setting mechanism includes a sensing member 15 which is connected in a well-known manner (not shown for reasons of clarity of illustration) to an exposure setting member of the camera, such member for example being either the speed setting member, the diaphragm setting member or else an exposure value setting member, in order to effect an automatic exposure setting. The sensing member 15, in a manner to be described later, functions (in response to the operation of the shutter release button 6) to sense the position of the movable measuring member 7 of an electric exposure meter M which is built into the camera. The exposure meter M, as well as the sensing member 15 are housed in the top portion of the camera case 1 under a cover plate 1a. The cover plate 1a has windows 1b and 1c for a telemeter finder (combined view finder and distance meter) which is coupled to the intra-lens shutter assemblage of the camera and also a honeycomb window 1d provided for a photo-electric cell of the exposure meter M.

In accordance with the present invention, there is provided in conjunction with the above components a special, manually-operable device which is separate from and independent of the sensing member 15 and the camera or shutter release button 6, and which functions to hold the movable measuring member 7 in its various adjusted positions prior to the taking of a photograph (prior to actual effecting of the exposure).

By the provision of such position-fixing device the movable measuring member 7 of the exposure meter can be held or detained in its various adjusted positions as determined by the existing light conditions, independently of the operation of the shutter or camera release. This provides the special advantage that the exposure setting procedure, in a camera constructed in accordance with the invention, can be effected not only on the basis of the light intensity values measured from the place of exposure (actual point at which the photograph is to be taken), but also that exposure settings can be effected on the basis of the so-called "object measuring" procedure, wherein the photographer closely approaches the object to be photographed and measures the reflection of that area which is of special importance for the photograph. The device for fixing the position of the movable member or coil 7 of the exposure meter comprises a clamping or position-fixing member 8. The said member 8 is constructed, in the illustrated embodiment of the invention, as a hollow cylinder which bears on a stationary fixed portion of the measuring mechanism of the exposure meter. The position fixing member 8 is vertically movable, and is acted on by a compression spring 9 which tends to keep it in engagement with an operating device which will shortly be described in detail below. To cooperate with the movable measuring member 7, the position-fixing member 8 has a stepped curve or edge 8a, by means of which it engages, under the action of the spring 9, the needle or pointer 11 of the movable measuring member 7. As shown in the drawings, the needle 11 is movable over and may be clamped against a fixed support 10 (FIG. 4).

The operating device for the position-fixing member 8 comprises a manually operable pin or button 13 which is movable in a vertical direction against the action of a helical compression spring 12, and which is fixedly connected to a stop pin 14 provided for engagement with the position-fixing member 8. The spring 9 which influences the position-fixing member 8 is weaker than the spring 12, whereby it may be overcome by the action of the latter.

The sensing member 15 is also constructed in the form of a hollow cylinder which may be guided by the position-fixing member 8 as shown in the illustrated embodiment. The sensing member 15 is under the action of a helical compression spring 16 which tends to keep the member engaged with a collar or flange 6a provided on the shutter release 6. The spring 16 is weaker than the spring 5 of the shutter release, and may be overcome by the latter spring. The cooperation of the sensing member 15 with the movable measuring member 7, 11 is effected in the same manner as that involving the position-fixing member 8. That is, the sensing member 15 is provided with a stepped curve or edge 15a which is arranged to engage, and clamp against the support 10, the measuring mechanism needle 11 under the action of the spring 16 in response to operation of the shutter release 6.

The adjusted position of the needle 11, and hence the extent of adjusting movement of the sensing member 15 and the position-fixing member 8 is responsive to the light intensity which prevails during the exposure, as well as being dependent on the setting of other exposure influencing factors, such as film sensitivity and filter factors. When setting the movable measuring member 7 the said factors can be taken into consideration in any well-known manner, as for example by effecting a rotary adjustment of the measuring mechanism M. The invention does not relate to the connection of the sensing member 15 with the associated exposure setting member. Such connection is accordingly not shown in the illustrated embodiment of the invention and can be effected in any well-known manner, as for example by means of a lever-type transmission.

In accordance with the invention, the position-fixing member 8 can be retained in its operative position by means of a novel locking device which selectively is either released automatically during the operation of the camera or shutter release 6 or else is manually releasable.

This has the distinct and important advantage that the movable measuring member 7 of the exposure meter can be held in its adjusted position for any length of time without requiring any positive holding act on the part of the operator. On the other hand, the manual releasability of the locking device associated with the position-fixing member makes it possible to release the movable measuring member at any desired time, whereby the measuring process can be repeated as desired. This is of special importance if, for example, it is decided to drop the idea of carrying out a planned photograph, or if a repetition of measurement of the light intensity becomes necessary for any other reason.

The locking device, as shown in the illustrated embodiment of the invention, is constituted as a single two-armed lever 17 whereby there is effected a desirable economy in manufacture, together with trouble-free operation. The lever 17 is pivotally carried by a pin 18 secured to the camera, and the lever is acted on by a spring 19 which biases it in a clockwise direction and tends to keep it in the position shown in FIG. 3. In such position, a lug 17a of the lever 17 is disposed in the path of movement of a member 20 which interconnects the members 13 and 14 associated with the position-fixing member 8. The lever 17 also has an arm 17b located in the path of movement in a conical attachment 6b provided on the camera release plunger 6.

The cooperable action between the lever 17 and the members 20 and 6 is apparent from FIGS. 4, 5, 7 and 8, as follows:

Upon depressing the pin or button 13 associated with the position-fixing member 8 against the action of the spring 12, the connecting member 20 engages a sloping surface providing on the lug 17a, this occurring subsequent to engagement and fixing of the needle 11 by the stepped edge 8a of the position-fixing member 8. Upon further depression of the pin 13, the lever 17 is pivoted counterclockwise as seen in FIG. 3 against the action of the spring 19, and the member 20 is shifted completely past the lug 17a. The spring 19 now returns the lever 17 to the initial position of FIG. 3, thereby causing the lug 17a to be disposed above the connecting member 20 as indicated in FIG. 5. The members 13 and 14 are thereby retained against the action of the spring 12 in a position corresponding to the operative condition of the position-fixing member 8.

Upon these movements being effected, the needle 11 of the measuring device will be retained or clamped in its adjusted position, which is indicative of the existing light conditions. Such position of the needle 11 may now be utilized at any time, without disturbance due to repositioning the camera, to effect a proper positioning of the sensing member 15, whereby the setting member of the camera will be adjusted in accordance with the light conditions which initially deflected the needle 11. Therefore the preliminary positioning of the needle 11, to later control the setting, is accomplished prior to actuation of the shutter or camera release, and prior to setting into motion the means which operate the shutter to effect an exposure.

If, before the actual taking of the picture, the operator should desire to remeasure the light conditions, or if it should be necessary for any other reason to release the needle 11, this may be readily effected manually. Otherwise the release of the needle 11 is effected automatically at the time that the exposure is being made.

The release of the locking device 17, for the purpose of releasing the measuring mechanism needle 11 from the position-fixing member 8, is effected in any case by counterclockwise actuation of the lever 17 as viewed in FIG. 3. Such actuation may be done either automatically during the operation of the shutter release 6, or else manually.

In the case of automatic release, the lever 17 is pivoted by the conical attachment 6b provided on the shutter release plunger 6, such pivotal movement of the lever 17 being against the action of the spring 19 thereof. For such movement of the lever 17 the lug 17a is shifted out of engagement with the connecting member 20. This enables the members 8, 13 and 14 to return to their initial positions under the action of the spring 12.

For the purpose of manually releasing the locking device, the lever 17 has a finger piece 17c projecting from the rear wall of the camera, by means of which the lever can be manually shifted against the action of the spring 19.

I claim:

1. In a photographic camera of the type providing for automatic exposure settings and having a shutter release and an exposure meter with a movable measuring member and a sensing member which senses the position of said measuring member in response to operation of the shutter release, the improvement which comprises a manually operable member separate from and independent of the shutter release and sensing member; and a position-fixing device comprising a piece separate from said sensing member and shutter release and controlled by the manually operable member, for holding the measuring member of the exposure meter against movement in different adjusted positions prior to actuation of the shutter release to effect the exposure.

2. The invention as defined in claim 1, in which there is a manually releasable locking device for retaining the said position-fixing device in its operative position.

3. The invention as defined in claim 2, in which the locking device comprises a lever and a spring acting on the lever, said position-fixing device including a member engaged by the lever when the fixing device is in operative position, said lever being manually pivotally movable against the action of said spring.

4. The invention as defined in claim 3, in which there is a finger-engageable plunger for effecting release of the locking device.

5. The invention as defined in claim 3, in which there are means responsive to actuation of the shutter release, for releasing the said locking device.

References Cited in the file of this patent

UNITED STATES PATENTS

| | | |
|---|---|---|
| 2,188,820 | Riszdorfer | Jan. 30, 1940 |
| 2,206,626 | Blechner | July 2, 1940 |
| 2,868,095 | Gebele | Jan. 13, 1959 |
| 2,925,760 | Broschke | Feb. 23, 1960 |